(12) United States Patent
Dallwig et al.

(10) Patent No.: US 7,686,338 B2
(45) Date of Patent: Mar. 30, 2010

(54) SEAT-BELT PRESENTER FOR A MOTOR VEHICLE

(75) Inventors: Claus Dallwig, Rödental (DE); Bern Freisleben, Bad Staffelstein (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 234 days.

(21) Appl. No.: 11/918,463

(22) PCT Filed: Apr. 3, 2006

(86) PCT No.: PCT/DE2006/000609

§ 371 (c)(1),
(2), (4) Date: Nov. 9, 2007

(87) PCT Pub. No.: WO2006/108383

PCT Pub. Date: Oct. 19, 2006

(65) Prior Publication Data

US 2009/0085339 A1     Apr. 2, 2009

(30) Foreign Application Priority Data

Apr. 12, 2005   (DE) .................. 10 2005 017 750

(51) Int. Cl.
*B60R 22/03* (2006.01)
(52) U.S. Cl. .................. 280/801.1; 297/473; 297/481
(58) Field of Classification Search .............. 280/801.1; 297/473, 481
See application file for complete search history.

(56) References Cited

U.S. PATENT DOCUMENTS 5,505,461 A * 4/1996 Bell et al. .................. 463/25

6,279,954 B1 * 8/2001 Townsend et al. ......... 280/801.1
6,883,834 B2 * 4/2005 Grabowski et al. ....... 280/801.2
2001/0040369 A1   11/2001 Townsend et al.
2006/0181073 A1 * 8/2006 Sugiyama et al. ........ 280/801.1

FOREIGN PATENT DOCUMENTS

DE      35 37 089 A1    4/1987

(Continued)

OTHER PUBLICATIONS

English translation of International Preliminary Examination Report for corresponding PCT application No. PCT/DE2006/000609, dated Dec. 11, 2007.

(Continued)

*Primary Examiner*—Paul N Dickson
*Assistant Examiner*—James English
(74) *Attorney, Agent, or Firm*—Christie, Parker & Hale, LLP

(57) ABSTRACT

A seat-belt presenter for a motor vehicle includes a seat-belt capture unit for supplying a seatbelt, a guide device for supplying and retracting the seat-belt capture unit, a pivoting element and a pivoting unit which, together with the pivoting element, form the seat-belt capture unit. The pivoting unit contains a locking device which during the supply operation, locks the pivoting element in its expanded position in such a manner that it does not pivot inward under the dynamic effect of the seatbelt, permits the pivoting element to pivot inward with manual application of force while it is still locked, and automatically unlocks during retraction of the guide device.

12 Claims, 7 Drawing Sheets

FOREIGN PATENT DOCUMENTS

| | | |
|---|---|---|
| DE | 199 01 276 A1 | 7/2000 |
| EP | 1736382 A1 * | 12/2006 |
| GB | 2 235 361 A1 | 3/1991 |
| GB | 2 235 362 A | 3/1991 |
| WO | WO 2006010484 A1 * | 2/2006 |

OTHER PUBLICATIONS

International Search Report, dated Jul. 26, 2006, corresponding to PCT/DE2006/000609.

* cited by examiner

SEAT-BELT PRESENTER FOR A MOTOR VEHICLE

CROSS-REFERENCE TO A RELATED APPLICATION

This application is a National Phase Patent Application of International Patent Application Number PCT/DE2006/000609, filed on Apr. 3, 2006, which claims priority of German Patent Application Number 10 2005 017 750.6, filed on Apr. 12, 2005.

BACKGROUND

The invention relates to a seat-belt presenter for a motor vehicle.

Seat-belt presenters for motor vehicles, which have a guide means and a seat-belt capture unit, which is arranged on the guide means, for supplying a seatbelt, are known. During the supply operation, the seat-belt capture unit moves out of a rest position in the internal paneling of the motor vehicle, grasps a seatbelt and moves the latter into a presentation position in which a person sitting on a motor vehicle seat can easily take hold of the seatbelt. The seat-belt capture unit contains a pivoting unit which, during the supplying of the seat-belt presenter, pivots a pivoting element out of a rest position into an expanded position running transversely with respect to the path of movement, and, with the pivoting element in the expanded position, grasps the seatbelt and moves it into the presentation position.

In its rest position before the beginning of the supply operation, the pivoting element bears against the guide rod and, during the supply operation, is pivoted in the direction of movement until an expanded position transversely with respect to the path of movement is reached, and thus uses a curved capturing surface to grasp the seatbelt and to supply it to the user. So that, during the supplying of the seatbelt, the force exerted on the pivoting element by the seatbelt does not lead to the pivoting element pivoting inward, a locking device is required.

SUMMARY

It is the object of the present invention to provide a seat-belt presenter of the type described at the beginning, which has a pivoting unit for a pivoting element with a simple and reliable locking device which permits the seat-belt presenter to be retracted, even in the manual emergency mode, without the seat-belt presenter suffering mechanical damage.

The solution according to the invention provides a seat-belt presenter which reliably supplies a seatbelt and, in the event of an emergency, can be pushed manually into the interior paneling of the motor vehicle without the seat-belt presenter being damaged.

According to the invention, it is provided that the pivoting unit has a locking device which
 in the supply mode, locks the pivoting element, which is pivoted transversely with respect to the path of movement, in such a manner that the pivoting element does not pivot inward under the dynamic effect of the seatbelt on the pivoting element during the supply operation,
 in the emergency mode, permits the pivoting element to pivot inward, even in the locked state, without the seat-belt presenter suffering mechanical damage, and
 unlocks automatically during the retraction operation.

During the supplying of the seat-belt presenter, the pivoting unit pivots the pivoting element in the direction of movement into an expanded position running transversely with respect to the direction of movement, and locks it in this position with the aid of the locking device. This prevents the force exerted on the pivoting element by the seatbelt leading to the pivoting element pivoting inward. The locking device is at the same time produced for a possible emergency mode in such a manner that the pivoting element can be pivoted inward by manual application of force even in the locked state. During the retraction operation, the locking is automatically canceled irrespective of whether the retraction operation takes place in normal operation via a drive or manually in the emergency mode. Such a locking device ensures that, during a manual retraction operation, for example if the electric supply fails, the seat-belt presenter does not suffer mechanical damage and, in particular, the pivoting element does not break off.

The pivoting unit is designed in such a manner that, firstly, during the supply operation, the pivoting element cannot pivot inward because of the force exerted on the pivoting element by the seatbelt, but, secondly, it can pivot inward when a force is exerted on the pivoting element, which is greater by a factor, which can be set by the design of the pivoting unit, than the dynamic effect of the seatbelt. This provides a safety measure for the emergency mode, which prevents the pivoting element from breaking off.

The pivoting unit and the locking device are preferably controlled by the supply movement of the guide means. This can take place by means of mechanical elements, in particular displaceable elements and spring elements, which interact with the guide means and are displaced relative to the guide means during the supply and retraction operation. However, it is also conceivable for one or more separate, in particular electric drives to be used for the operation of the pivoting unit.

In one exemplary embodiment, the pivoting unit has a control element which interacts with a locking element, a stop element, the pivoting element, a gear and the guide means in such a manner that the supply movement causes the pivoting element to be pivoted into its expanded position and locked. In this case, the control element is coupled to the pivoting element via a coupling region and a gear, is displaced relative to the guide means by the supply operation and the associated movement of the guide means, and thus controls the pivoting of the pivoting element into the expanded position. The control element in turn is connected to the locking element which, together with the stop element, locks the pivoting element in the expanded position.

As a safety measure for the emergency mode, the pivoting element can be pivoted inward manually from its expanded position when a force is exerted on the pivoting element, which exceeds the dynamic effect of the seatbelt on the pivoting element. For this purpose, the pivoting unit can contain mechanical springs and additional displaceable elements which act on the control element, the locking element and the stop element in such a manner that the pivoting element is pivoted in the supply movement and is held in the expanded position. The selection of the spring elements and of the ratio of the spring forces with respect to one another makes it possible to set the manual application of force at which the pivoting element can be pivoted inward.

Furthermore, the pivoting of the pivoting element during the supply operation can be controlled by the spring elements, and therefore the pivoting preferably begins only after the pivoting element has emerged from the interior paneling. This ensures that, during the pivoting operation, the pivoting element does not touch and damage the interior paneling and also is not damaged itself by the interior paneling.

In one exemplary embodiment, a pivoting unit of this type contains a slide and three spring elements. The control element and the stop element are connected displaceably via two spring means to the guide means, which can be displaced relative to the motor vehicle body, while the third spring element couples the slide displacably to the motor vehicle body. The locking element is connected to the control element via an axis of rotation and, in order to lock the pivoting element in the expanded position, is pivoted about the axis of rotation in such a manner that it is blocked relative to the guide means in the supply direction by means of the stop element which is held in position by spring force. The magnitude of the force necessary in order to pivot the pivoting element inward in the locked position in the event of an emergency can be set by the selection of the spring elements which hold the control element and the stop element in position.

In order to ensure that the locking element pivots into its starting position during the retraction operation and the pivoting element is therefore unlocked, during the retraction of the guide means the locking means enters into a frictional connection with the slide and, as a result, is pivoted out of the locking position into its starting position. The pivoting of the locking element is brought about by the angular position of the locking element in the locking position relative to the slide and can be assisted by suitable shaping of the slide and of the locking element in the region of their points of contact.

BRIEF DESCRIPTION OF THE DRAWINGS

The concept on which the invention is based will be explained in more detail and further with reference to an exemplary embodiment which is illustrated in the following figures, in which.

DETAILED DESCRIPTION

Figure 1:
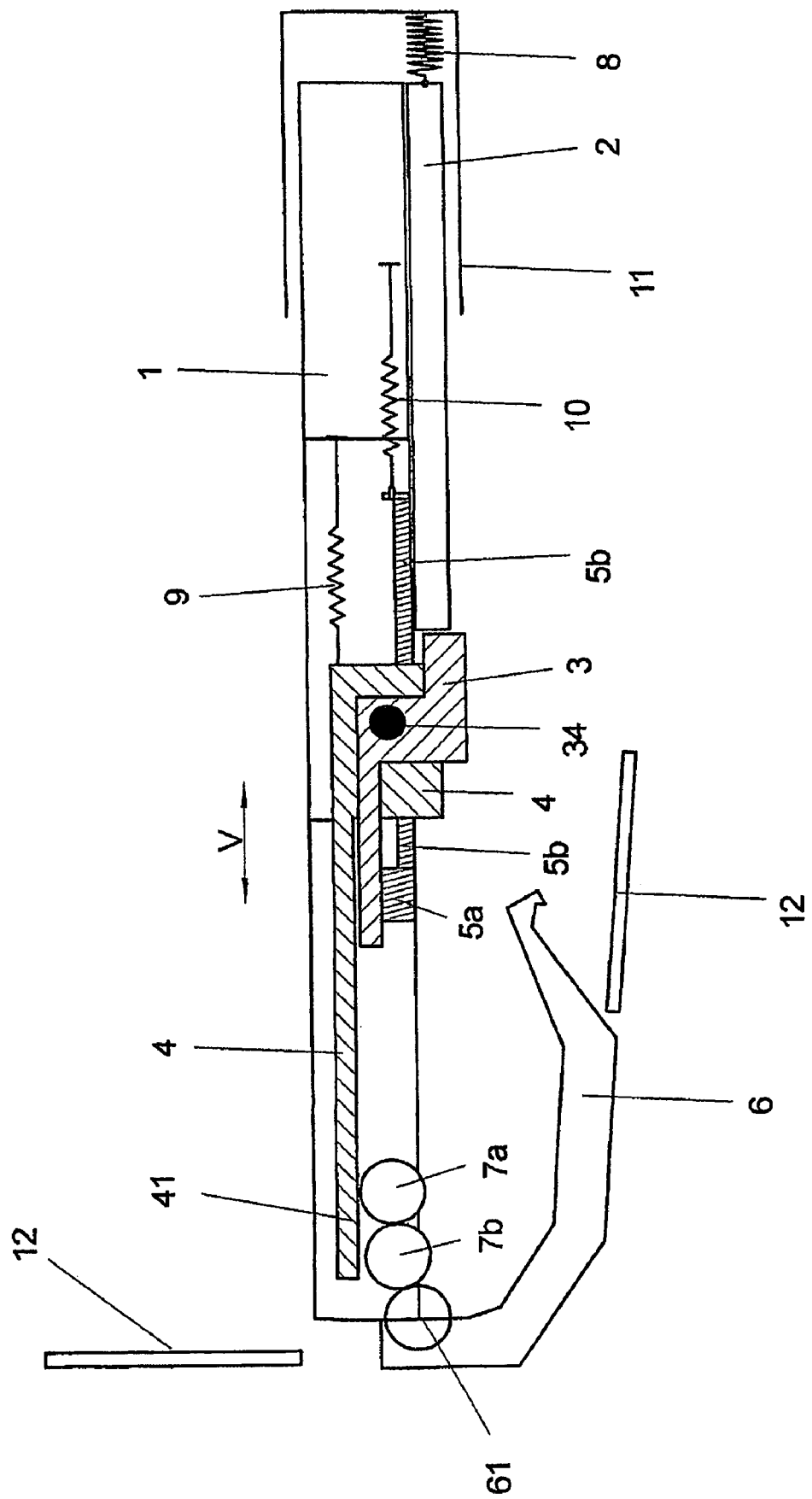
FIG. 1 shows a schematic side view of the seat-belt presenter in the rest position in the interior paneling.

FIG. 1 shows a side view of a seat-belt presenter which comprises a guide means, designed as a guide rod 1, with a seat-belt capture unit arranged thereon. The guide rod 1 of the seat-belt presenter is surrounded by a housing-like installation unit 11 with which the seat-belt presenter is fastened to a motor vehicle body and on which a motor and a gear unit, which is connected to the motor, are arranged, the motor and gear units serving as the drive for supplying and retracting the guide rod 1. During the supplying of the seat-belt presenter, the guide rod 1 moves through an opening in the interior paneling 12, uses the seat-belt capture unit to grasp the seatbelt and guides the latter into a presentation position in which a person sitting on a motor vehicle seat can easily take hold of the seatbelt in order to put it on. The seat-belt capture unit has a pivoting unit with a pivoting element 6 which, during the supply operation, is pivoted in the direction of movement into an expanded position running transversely with respect to the path of movement and grasps the seatbelt.

FIG. 1 shows the seat-belt presenter in a rest position before the beginning of the supply operation, in which the guide rod 1 is retracted into the interior paneling 12 and is concealed by the interior paneling 12. All that is visible of the seat-belt presenter in this state from the interior of the motor vehicle is the pivoting element 6 which essentially closes the opening in the interior paneling 12. A particularly advantageous visual appearance is obtained here if the surface contour of the pivoting element 6, which contour faces the motor vehicle interior, matches the shaping of the interior paneling 12.

The pivoting of the pivoting element 6 during the supply and retraction operations takes place by means of a pivoting unit which is designed in such a manner that both the pivoting of the pivoting element 6 into the expanded position and the pivoting inward are respectively controlled by the supply and retraction movements of the guide rod 1. The pivoting unit comprises a locking device by means of which the pivoting element 6 is locked in the expanded position such that the pivoting element 6 cannot pivot inward under the dynamic effect of the seatbelt. The functioning of the pivoting unit and of the locking device is explained more precisely below.

FIGS. 1 to 7 show schematically the seat-belt presenter in various positions before and during the supply and retraction operation.

First of all, FIG. 1 shows the seat-belt presenter in the rest position before the beginning of the supply operation. The pivoting unit is formed by displaceable elements and mechanical springs and has a slide 2, a locking element 3, a control element 4 and a stop element 5a, 5b, which are arranged essentially parallel to the guide rod. The slide 2 is connected via a first spring element 8 in the form of a compression spring to the installation unit 11 and can be displaced along the displacement axis V essentially parallel to the guide rod 1. The displacement travel of the slide 2 can be restricted in both directions along the displacement axis V by means of mechanical stops. The control element 4 and the stop element 5a, 5b are connected to the guide rod 1 via two further spring elements 9, 10, designed as tension springs, and can be displaced parallel to the guide rod 1. The locking element 3 is connected to the control element 4 via an axis of rotation 34 in such a manner that it can be pivoted about the axis of rotation 34. In the rest position, the locking element 3 extends essentially parallel to the displacement axis V and is frictionally connected to the one end of the slide 2. Furthermore, the locking element 3 is prestressed counter clockwise in relation to the control element 4 by a torsion or bending spring (not illustrated in FIG. 1).

In the rest position before the beginning of the supply operation, the compression spring 8, which is connected to the slide 2, is in its maximally compressed state while the tension spring, which is connected to the control element 4, is in the maximally extended state. As a result, the control element 4 is prestressed via the frictional connection of the slide 2 to the locking element 3, which is connected to the control element 4 via the axis of rotation 34, and is held in a maximally deflected position relative to the guide rod 1 in the supply direction z.

The control element 4 comprises a coupling region in the form of a first toothed segment section 41 which extends along the displacement axis V on a rectilinear section of the control element 4. Said toothed segment section 41 engages in a gear which is formed from two pinions 7a, 7b and, in turn, engages in a coupling section of the pivoting element 6 in the form of a second toothed segment section 61. The pinions 7a, 7b and the pivoting element 6 are mounted rotatably via a respective axis of rotation which is fixed in position relative to the guide rod 1. The second toothed segment section 61 which engages in the second pinion 7b extends along a segment of a circle which is spaced apart radially from the axis of rotation of the pivoting element 6.

Owing to the frictional connection between the slide 2 and the locking element 3 and the coupling of the locking element 3 to the control element 4 via the axis of rotation 34, the spring forces of the compression spring 8 and of the tension spring 9 act counter to one another. The spring constants of the compression spring 8 and of the tension spring 9 are designed in such a manner that, in the rest position, the spring force of the compression spring 8, which is exerted on the slide 2, the locking element 3 and the control element 4, exceeds the spring force of the tension spring 9, which acts in the opposite direction. As a result, the slide 2 presses the control element 4 along the displacement axis V into a rest position in which the control element 4 is maximally deflected relative to the guide rod 1 in the supply direction Z and, via the pinions 7a, 7b, holds the pivoting element in the state in which it is pivoted inward. The rest position of the control element 4 can be defined by a mechanical stop which restricts the deflection of the control element 4 and consequently also the extension of the second tension spring 9. In this rest position of the control element 4, the teeth of the pinion 7a engage in the initial region of the linear toothed segment section 41, which region faces the tension spring 9.

In the rest position, the locking element 3 extends essentially parallel to the displacement axis V of the control element 4 and rests on the stop element 5a, 5b. The stop element is constructed in two parts from a stop 5a and a rectilinear guide 5b, but these are connected to each other in such a manner that they form a unit. The tension spring 10, which is connected to the rectilinear guide 5b of the stop element 5a, 5b, is relaxed in the rest position. The displacement travel of the stop element 5a, 5b can be restricted in both directions along the displacement axis V by means of mechanical stops.

Figure 2:
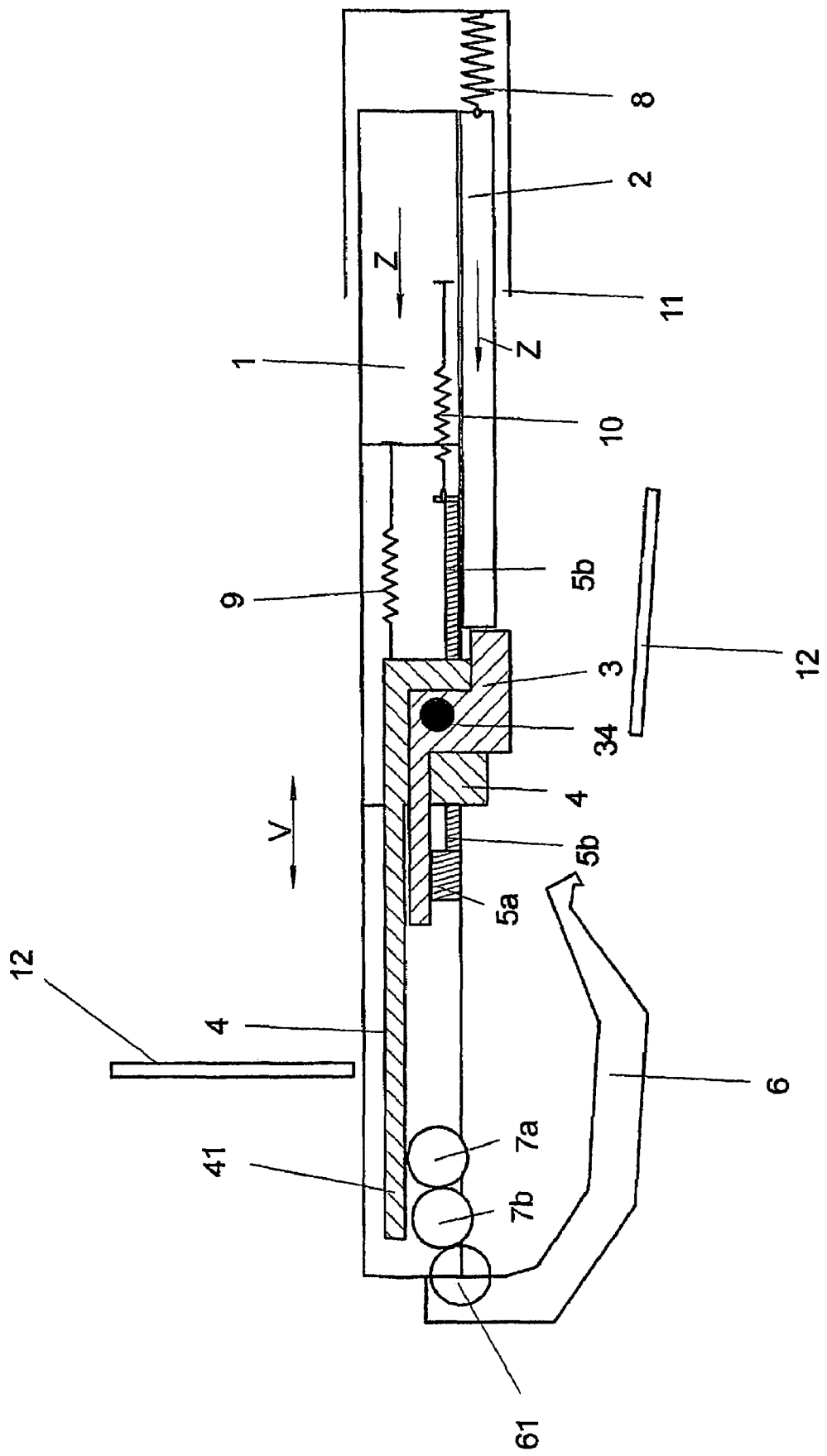
FIG. 2 shows a schematic side view of the seat-belt presenter during the supply operation before the pivoting position is reached.

FIG. 2 shows the seat-belt presenter at the beginning of the supply operation. When the guide rod 1 is moved out of the rest position illustrated in FIG. 1, the slide 2, driven by the compressed compression spring 8, will first of all follow the guide rod 1 in the supply direction Z and, in the process, will maintain the frictional connection to the locking element 3 and therefore also to the control element 4. By means of the movement of the guide rod 1, the force exerted on the slide 2 by the compression spring 8 decreases continuously, but initially exceeds the force of the tension spring 9 and thus holds the control element 4 in position relative to the guide rod 1. The spring constants of the compression spring 8 and of the tension spring 9 are designed in such a manner that an equilibrium of the spring forces is achieved only after the guide rod 1 together with the pivoting element 6 coupled to the guide rod 1 has emerged from the opening in the interior paneling 12. The effect achieved by this is that the pivoting element 6 only begins to pivot after a pivoting position is reached, namely when the pivoting element 6 can be pivoted unobstructed by the interior paneling 12.

During the further supply operation, the spring forces of the compression spring 8 and of the tension spring 9 on the control element 4 decrease uniformly, the compression spring 8 extends and the tension spring 9 contracts, and the control element 4 is displaced relative to the guide rod 1 counter to the supply direction Z. By means of the operative connection of the control element 4 to the pinions 7a, 7b, and the pinions 7a, 7b to the pivoting element 6, displacement of the control element 4 drives a rotation of the pinion 7a, 7b and thus the pivoting of the pivoting element 6 into the expanded position running transversely with respect to the path of movement of the seat-belt capture unit.

Figure 3:
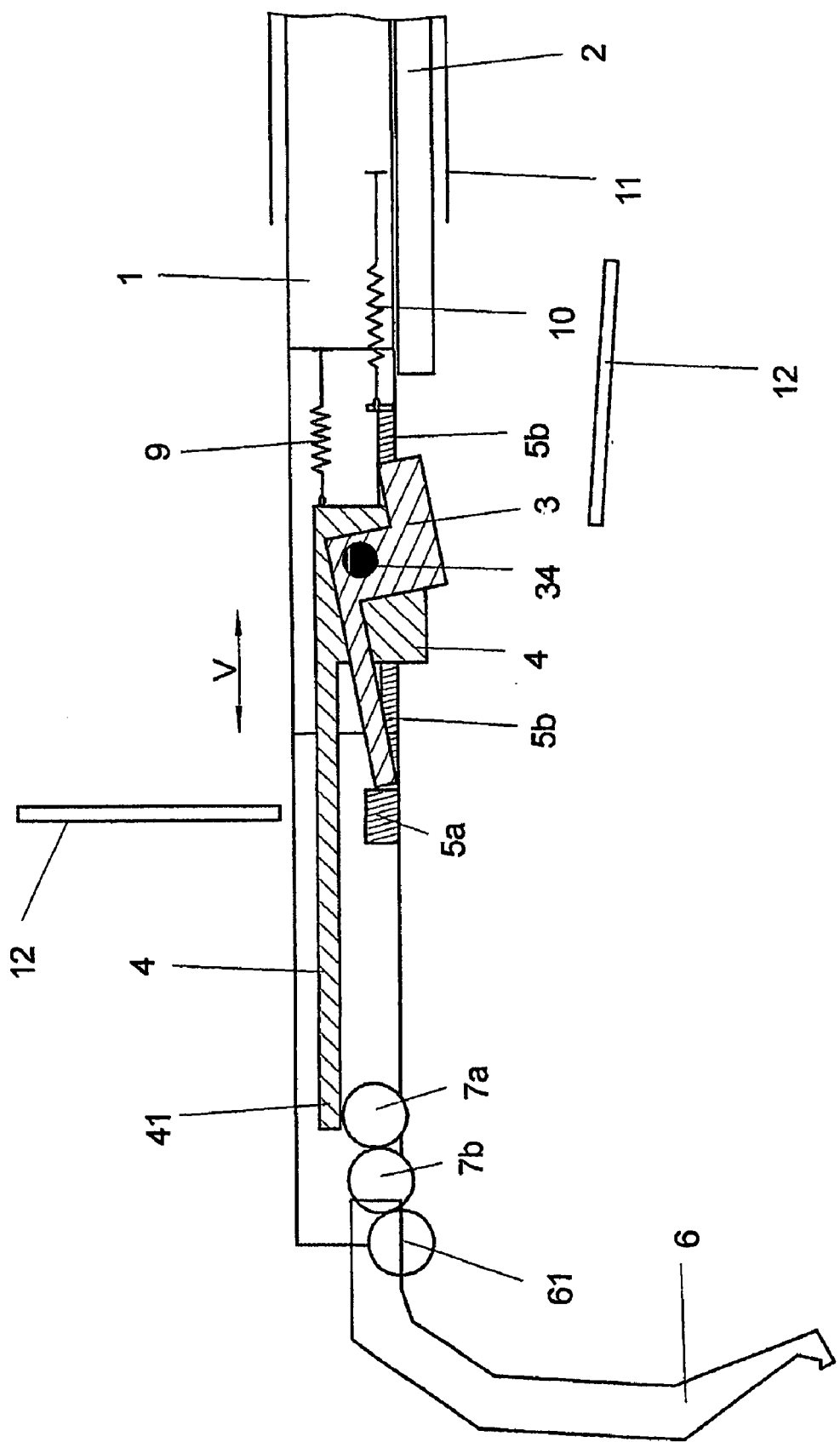
FIG. 3 shows a schematic side view of the seat-belt presenter during the supply operation with the pivoting element in the expanded and blocked position.

When the expanded position is reached, the first pinion 7a engages on the control element 4 in that end section of the toothed segment section 41 which faces away from the tension spring 9, as illustrated in FIG. 3, and the pivoting of the pivoting element 6 is concluded. For precise fixing of the expanded position, the maximum deflection of the pivoting element 6 can be restricted, for example by means of a mechanical stop between the pivoting element 6 and the guide rod 1.

During the further supply of the guide rod 1 with the pivoting element 6 arranged thereon, the frictional connection between the slide 2 and the locking element 3 is canceled. As soon as the compression spring 8 connected to the slide 2 has relaxed or the slide 2 strikes against a stop in order to restrict the displacement travel of the slide 2, the slide 2 remains in its position while the control element 4 and therefore also the locking element 3 are moved further by the guide rod 1 and therefore the frictional connection is canceled. By means of the displacement of the control element 3 during the pivoting operation of the pivoting element 6, the locking element 3 has also been displaced relative to the stop element 5a, 5b. As soon as the pivoting element 6 has reached the expanded position, the locking element 3 is no longer supported by the stop element 5a and rotates about the axis of rotation 34 relative to the control element 4 by means of the prestressing in relation to the control element 4, which is brought about by means of a torsion or bending spring, and therefore that end of the locking element 3 which faces the pivoting element 6 comes to lie in front of the stop element 5a, as seen in the supply direction Z. Since the stop element 5a, 5b is held in position relative to the guide rod 1 by the spring force of the tension spring 10, the locking element 3 and therefore also the control element 4 are blocked relative to the guide rod 1 in the supply direction Z. The pivoting element 6 is thereby locked and, in the further supply operation, cannot be pivoted inward under the dynamic effect on the pivoting element 6 of the seatbelt.

During the normal retraction of the guide rod 1, driven by the motor drive, the pivoting operation of the pivoting element 6 takes place in reverse. During the retraction operation, the locking element 3 enters into a frictional connection with the slide 2, is rotated into its starting position by the angular position in its locking position relative to the slide 2 and therefore is no longer blocked by the stop element 5a, and therefore the pivoting element 6 is unlocked. The forces of the compression spring 8, which is connected to the slide 2, and of the tension spring 9, which acts on the control element 4, act counter to one another after the frictional connection of the slide 2 and of the locking element 3, and cause the compression spring 8 to be compressed and the tension spring 9 to be extended by the further retraction movement. As a result, the slide 2 and the control element 4, which is connected frictionally to the slide 2 via the locking element 3, is displaced relative to the guide rod 1 counter to the retraction direction R, and the pivoting element 6 is pivoted inward.

The procedure is somewhat different if the retraction of the guide rod 1 takes place manually, for example in the emergency mode if the electric supply fails.

Figure 4:
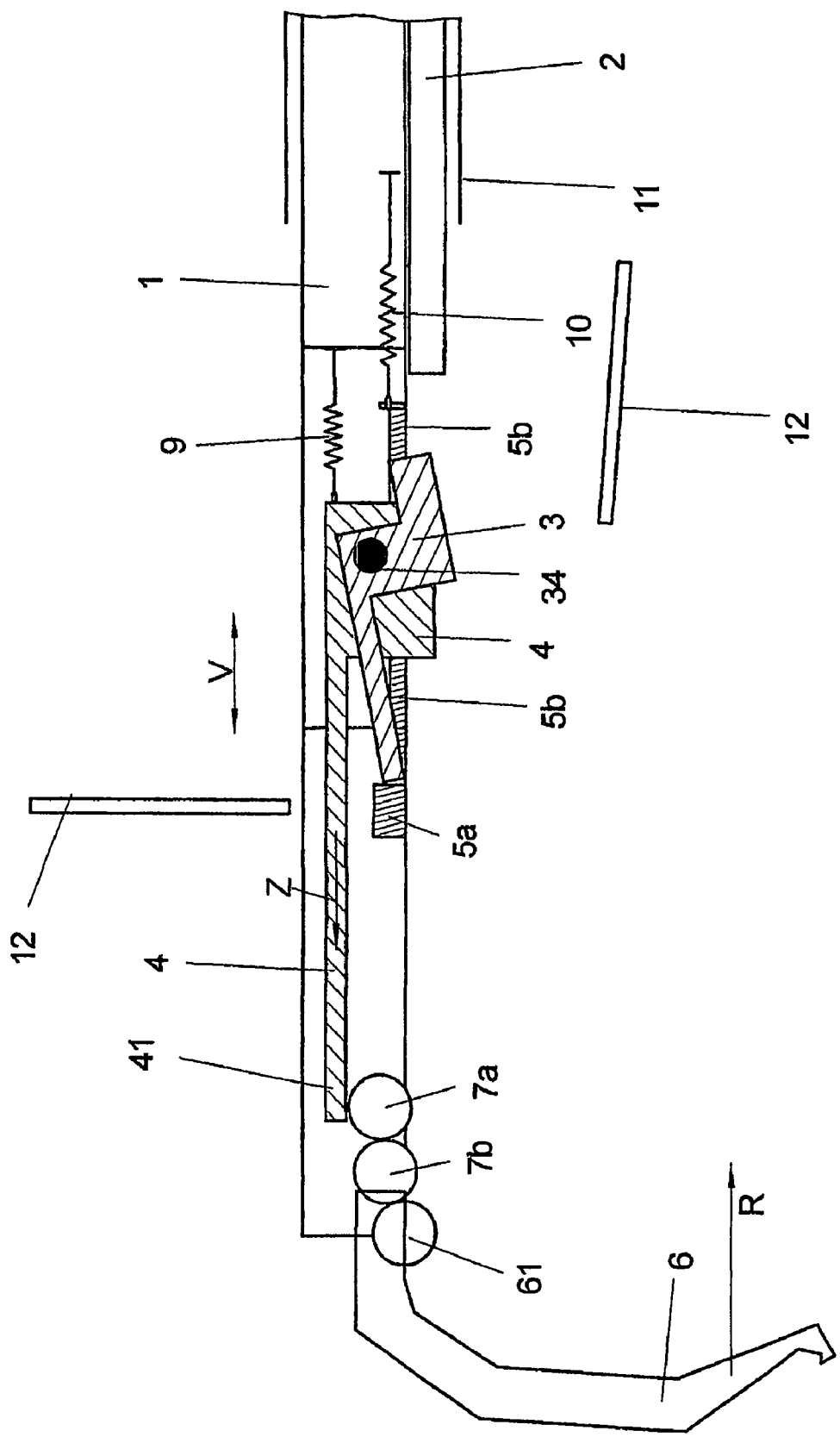
FIG. 4 shows a schematic side view of the seat-belt presenter at the beginning of the manual retraction operation.
Figure 5:
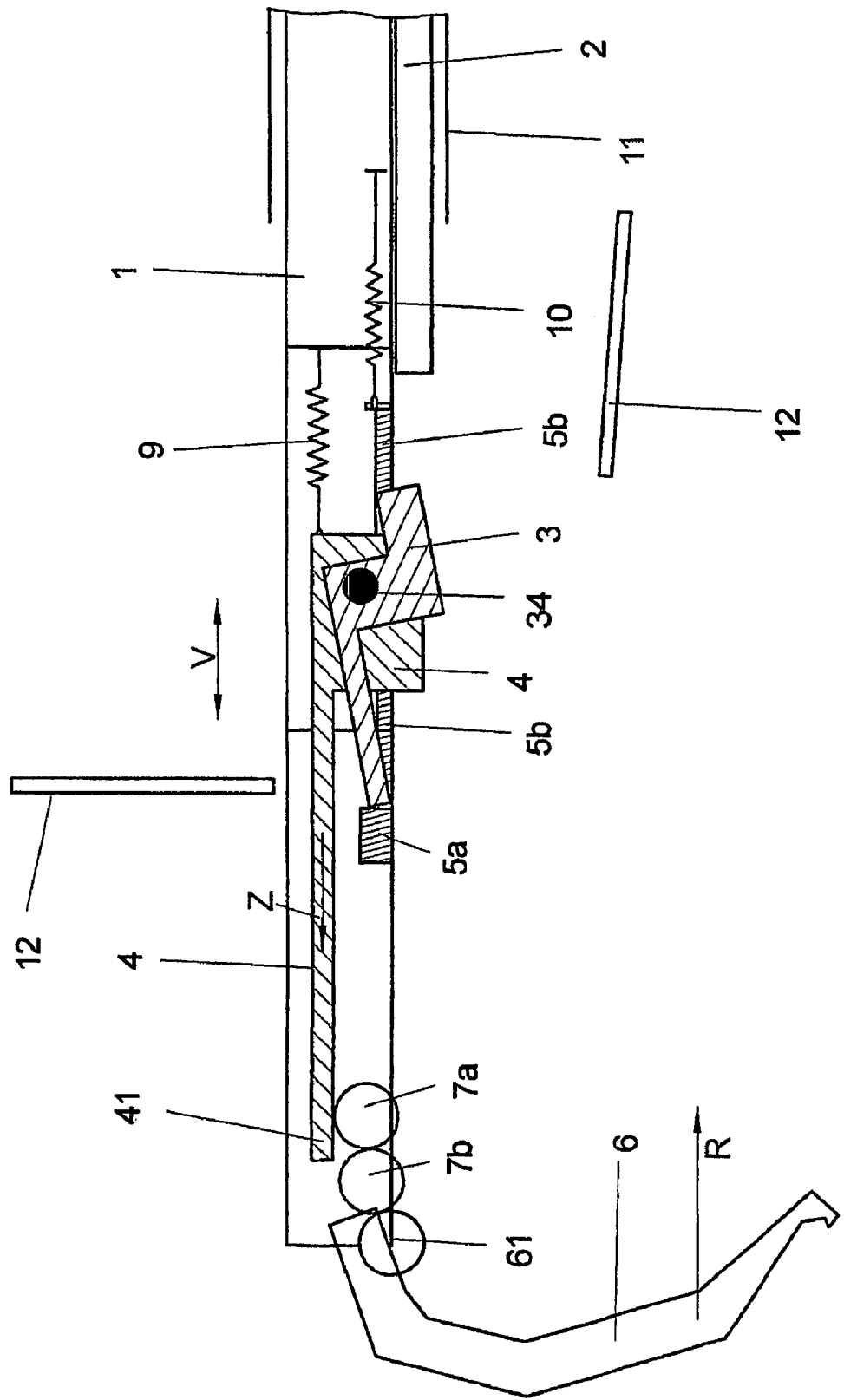
FIG. 5 shows a schematic side view of the seat-belt presenter during the manual retraction operation.

FIG. 4 shows the seat-belt presenter at the beginning of the manual retraction operation. During the manual retraction operation, a user first of all exerts force on the pivoting element 6. If this force is greater than the spring force of the tension spring 10 which holds the stop element 5a, 5b in position, then the pivoting element 6 is pivoted inward in the retraction direction R and the control element 4, which is coupled to the pivoting element 6 via the gear 7a, 7b, is displaced relative to the guide rod 1 counter to the retraction direction R. As a result, the stop element 5a, 5b is deflected counter to the retraction direction R by the locking element 3, which is connected to the control element 4, and both the tension spring 9 which acts on the control element 4 and the tension spring 10 which is connected to the stop element 5a, 5b are extended. This is illustrated in FIG. 5.

The pivoting element 6 can therefore be pivoted inward manually in the locked state if there is a sufficiently large dynamic effect on the pivoting element 6. The force required to pivot it inward is determined by the selection of the spring elements 9, 10 which hold the control element 4 and the stop element 5a, 5b and the spring constants of which generally have to be produced in such a manner that the operation to pivot it inward is not brought about by the dynamic effect on the pivoting element 6 of the seatbelt, but rather only by a sufficiently larger manual dynamic effect.

Figure 6:
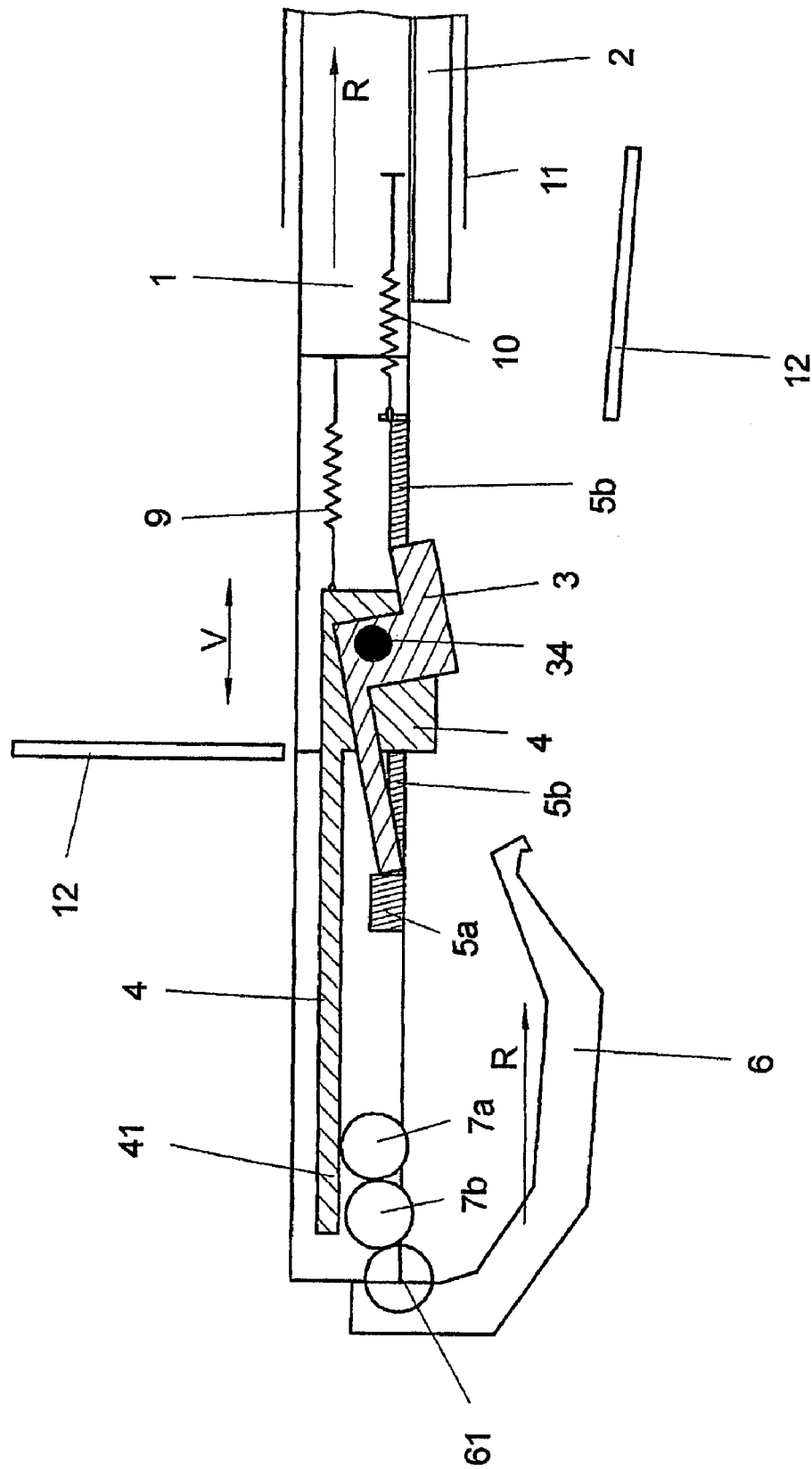
FIG. 6 shows a schematic side view of the seat-belt presenter during the manual retraction operation with the pivoting element in the state in which it is pivoted inward.

FIG. 6 shows the pivoting element 6 during the retraction operation in the state in which it is completely pivoted inward. In this state, the tension springs 9, 10 connected to the control element 4 and the stop element 5a, 5b are maximally extended, and the stop element 5a, 5b is maximally deflected relative to the guide rod 1. As already indicated above, the displacement travels of the control element 4 and of the stop element 5a, 5b can be restricted by mechanical stops. It is also conceivable that the displacement of the stop element 5a, 5b relative to the guide rod 1 in the retraction movement is restricted in such a manner that the pivoting element 6 initially cannot be pivoted inward completely but rather this is possible only after it is unlocked.

Figure 7:
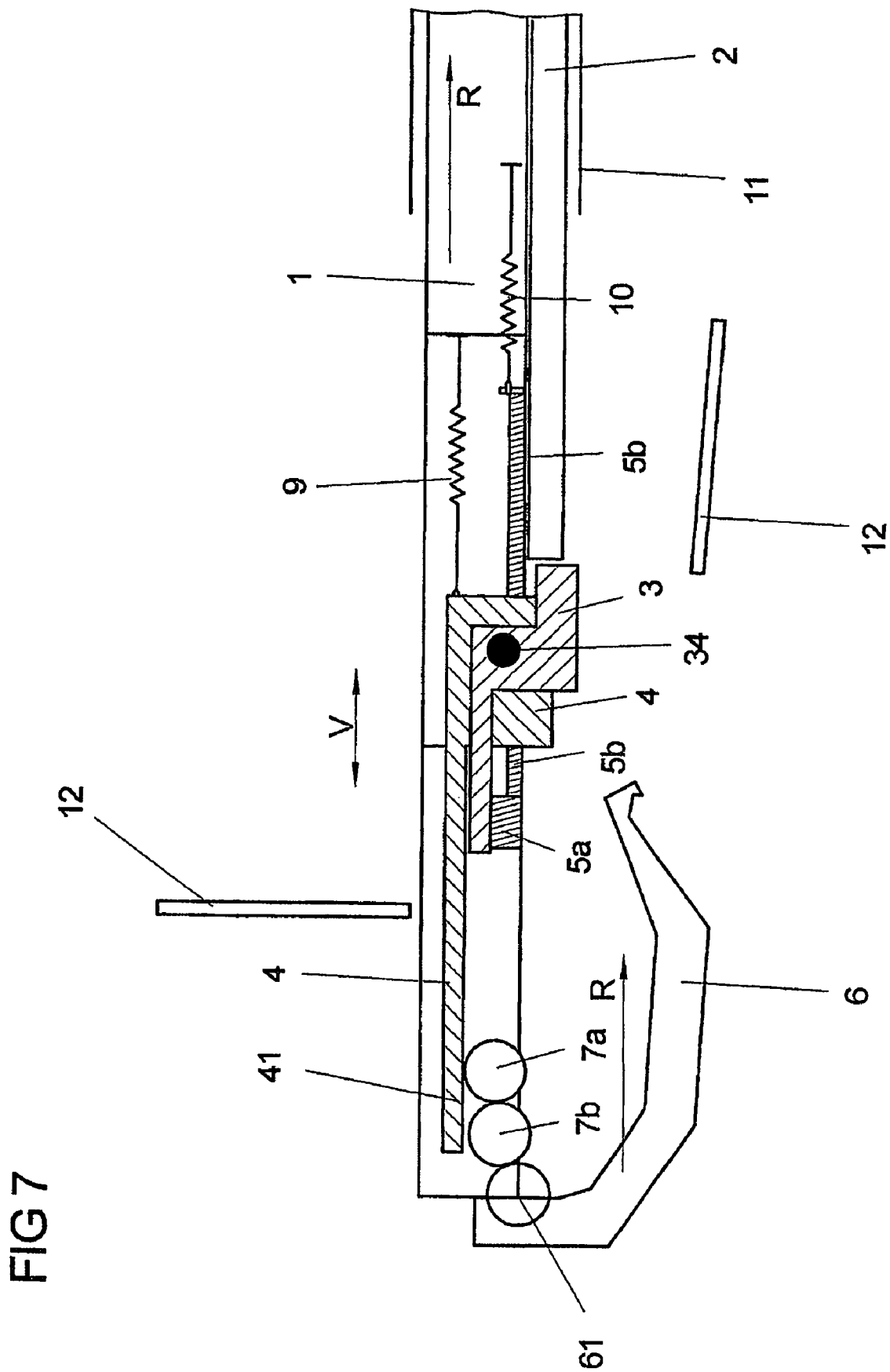
FIG. 7 shows a schematic side view of the seat-belt presenter during the manual retraction operation with the pivoting element in the unlocked state.

During the further retraction operation of the guide rod 1 in the retraction direction R, the locking element 3 enters into a frictional connection with the slide 2 and is rotated into its starting position, which is caused by the angular position of the locking element 3 with respect to the slide 2. The locking element 3 is therefore no longer blocked by the stop element 5a, and the pivoting element 6 is unlocked. After the unlocking operation, the stop element 5a, 5b is displaced by the spring force of the tension spring 10, which is stressed by the deflection of the stop element 5a, 5b, relative to the guide rod 1 into its starting position in which the tension spring 10 is relaxed and the stop element 5a lies under that end of the locking element 3 which faces the pivoting element 6. This is shown in FIG. 7.

For the further retraction operation, the guide rod 1 is pushed into the interior paneling 12, and the compression spring 8 connected to the slide 2 is compressed. As soon as the spring force of the compression spring 8 acting on the slide 2 exceeds the force of the tension spring 9 acting on the control element 4, the pivoting element 6 can no longer pivot, but rather is held in position by the force of the compression spring 8 via the slide 2, the locking element 3 and the control element 4. The retraction operation is concluded as soon as the guide rod 1 is pushed completely into the interior paneling 12 and the seat-belt presenter is therefore again located in its rest position.

Other embodiments of the pivoting unit and of the locking device are conceivable. Further variants of the seat-belt presenter can have, for example, a guide means running in a curved manner, can contain different structural forms and combinations of the spring elements or can use a different locking element which is not mounted rotatably about an axis of rotation but rather is moved into a locking position, for example, by displacement transversely with respect to the direction of movement of the guide means. Furthermore, the pivoting unit can be operated by one or more separate, in particular electric drives, instead of by the movement of the guide means. In principle, a multiplicity of variants are conceivable which, even in different embodiments, make use of the invention.

The invention claimed is:

1. A seat-belt presenter for a motor vehicle, the seat-belt presenter comprising:
   a seat-belt capture unit for supplying a seat belt;
   a guide device for supplying and retracting the seat-belt capture unit;
   a pivoting element coupled at one end to the guide device and configured to pivot about an axis of rotation, wherein the pivoting element in a rest position before the beginning of the supply operation, is directed with one component counter to the supply direction; and
   a pivoting unit wherein the pivoting unit pivots the pivoting element out of the rest position into an expanded position running transversely with respect to the path of movement during a seat belt supply operation;
   wherein the pivoting unit and pivoting element together from the seat belt capture unit;
   wherein the pivoting unit contains a locking device;
   wherein during the supply operation, the locking device locks the pivoting element in an expanded position in such a manner that the pivoting element does not pivot inward under the dynamic effect of the seatbelt;
   wherein the locking device permits the pivoting element to pivot inward with manual application of force while the pivoting element is still locked;
   wherein the locking device automatically unlocks during retraction of the guide device;
   wherein the pivoting unit contains mechanical springs and elements being displaceable in the direction of the guide device; and
   wherein the pivoting unit has a control element, a locking element, a stop element and a gear interacting with the guide device in such a manner that the supply operation causes the pivoting element to be pivoted into an expanded position and locked in the expanded position.

2. The seat-belt presenter of claim 1, wherein the pivoting unit is controlled by the movement of the guide device.

3. The seat-belt presenter of claim 1, wherein the locking of the pivoting element is automatically canceled both during manual retraction and during retraction with a drive.

4. A seat-belt presenter for a motor vehicle, the seat-belt presenter comprising:
   a seat-belt capture unit for supplying a seat belt;
   a guide device for supplying and retracting the seat-belt capture unit;
   a pivoting element coupled at one end to the guide device and configured to pivot about an axis of rotation, wherein the pivoting element in a rest position before the beginning of the supply operation, is directed with one component counter to the supply direction; and
   a pivoting unit wherein the pivoting unit pivots the pivoting element out of the rest position into an expanded position running transversely with respect to the path of movement during a seat belt supply operation;
   wherein the pivoting unit and pivoting element together form the seat belt capture unit;
   wherein the pivoting unit contains a locking device;

wherein during the supply operation, the locking device locks the pivoting element in an expanded position in such a manner that the pivoting element does not pivot inward under the dynamic effect of the seatbelt;

wherein the locking device permits the pivoting element to pivot inward with manual application of force while the pivoting element is still locked;

wherein the locking device automatically unlocks during retraction of the guide device;

wherein the pivoting unit contains mechanical springs and elements being displaceable in the direction of the guide device;

wherein the pivoting unit has a control element, a locking element, and a stop element interacting with the guide device in such a manner that the supply operation causes the pivoting element to be pivoted into an expanded position and locked in the expanded position; and wherein the locking element, the control element and the stop element are configured as rod elements, wherein the locking element and the control element are connected to each other via an axis of rotation, and wherein the control element and the stop element are mounted on the guide device in a manner such that they are displaceable along a displacement axis.

5. A seat-belt presenter for a motor vehicle, the seat-belt presenter comprising:

a seat-belt capture unit for supplying a seat belt;

a guide device for supplying and retracting the seat-belt capture unit;

a pivoting element coupled at one end to the guide device and configured to pivot about an axis of rotation, wherein the pivoting element in a rest position before the beginning of the supply operation, is directed with one component counter to the supply direction; and a pivoting unit wherein the pivoting unit pivots the pivoting element out of the rest position into an expanded position running transversely with respect to the path of movement during a seat belt supply operation;

wherein the pivoting unit and pivoting element together form the seat belt capture unit;

wherein the pivoting unit contains a locking device;

wherein during the supply operation, the locking device locks the pivoting element in an expanded position in such a manner that the pivoting element does not pivot inward under the dynamic effect of the seatbelt;

wherein the locking device permits the pivoting element to pivot inward with manual application of force while the pivoting element is still locked;

wherein the locking device automatically unlocks during retraction of the guide device;

wherein the pivoting unit contains mechanical springs and elements being displaceable in the direction of the guide device;

wherein the pivoting unit has a control element, a locking element, and a stop element interacting with the guide device in such a manner that the supply operation causes the pivoting element to be pivoted into an expanded position and locked in the expanded position; and wherein the pivoting unit has a slide and a first, a second and a third spring elements, wherein the spring elements interact with the control element, the locking element and the stop element in order to pivot and lock the pivoting element.

6. The seat-belt presenter of claim 5, wherein the pivoting of the pivoting element by the pivoting unit during the supply operation takes place only after the pivoting element has emerged from an interior paneling.

7. The seat-belt presenter of claim 6, wherein in the expanded position of the pivoting element, the locking element is blocked relative to the guide device in a supply direction with the stop element.

8. The seat-belt presenter of claim 5, wherein the slide is coupled displaceably via the first spring element to an installation unit for fastening the seat-belt presenter to a motor vehicle body.

9. The seat-belt presenter of claim 5, wherein the control element is coupled displaceably via the second spring element to the guide device being movable in order to supply and retract the seat-belt capture unit relative to an installation unit for fastening the seat belt presenter to a motor vehicle body.

10. The seat-belt presenter of claim 5, wherein the stop element is coupled displaceably via the third spring element to the guide device being movable in order to supply and retract the seat-belt capture unit relative to an installation unit for fastening the seat belt presenter to a motor vehicle body.

11. The seat-belt presenter of claim 5, wherein, during the retraction of the guide device, the slide acts on the locking element in such a manner that the locking device is unlocked.

12. The seat-belt presenter of claim 5, wherein the first spring element, the second spring element and the third spring element comprise compression springs or tension springs.

* * * * *